Dec. 20, 1966     YOSHIKAZU DOI ETAL     3,293,357

INTERNAL FOCUSING COLOR TELEVISION CAMERA

Filed July 30, 1963

INVENTORS
Yoshikazu Doi
Syusaku Hosaka
Hiroshi Nomura
By Stevens, Davis, Miller & Mosher
ATTORNEYS

United States Patent Office 3,293,357
Patented Dec. 20, 1966

3,293,357
INTERNAL FOCUSING COLOR TELEVISION
CAMERA
Yoshikazu Doi and Syusaku Hosaka, Saitama-ken, and
Hiroshi Nomura, Tokyo, Japan, assignors to Fuji
Shashin Koki Kabushiki Kaisha, Saitama-ken, Japan,
and Nippon Television Hosomo Kabushiki Kaisha,
Tokyo, Japan, both corporations of Japan
Filed July 30, 1963, Ser. No. 298,606
6 Claims. (Cl. 178—5.4)

This invention relates to an optical system for color television cameras which resolve the image formed by the taking lens in three colors to form an image of each color on a face plate of orthicon tube, on the way of relaying said image to a face plate of an image orthicon tube through a relay lens system, the focusing corresponding to the distance of the object which is accomplished not by displacing forward and backward a turrent provided with taking lenses, but by displacing a part of the relay lens system enclosed in the camera.

Figure 1:
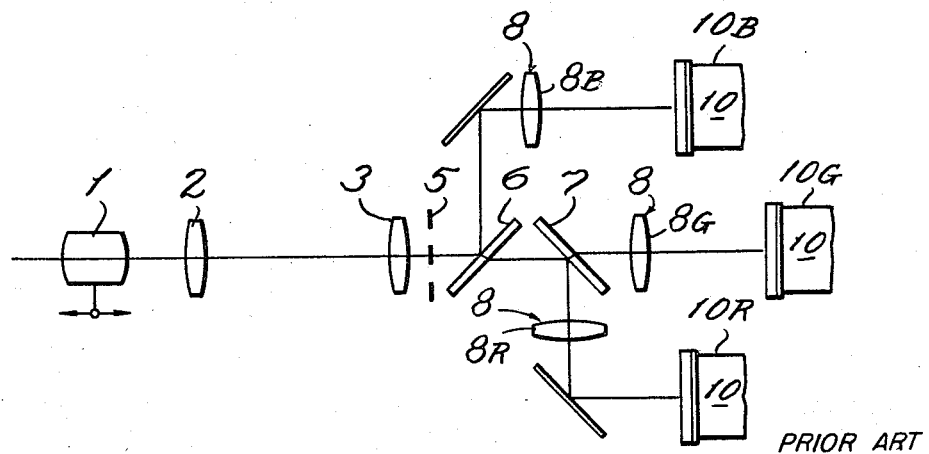
FIG. 1 shows the optical system of a color television camera with a known focusing mechanism which displaces backward and forward a turret.

To explain with reference to FIG. 1 the optical system of a color television camera with a known focusing mechanism which displaces backward and forward a turret, the image formed by taking lens 1, after being relayed by field lens 2, relay lenses 3 and 8, is again formed on a face plate of orthicon tube 10. In the relay lens system light flux is resolved in three colors by dichroic mirrors 6 and 7, interposed between 3 and 8 to form an image of each color on different orthicon tubes. The turret provided with several taking lenses 1 of different focal lengths is so arranged as to place the take lens to be used in the optical path by rotating the turret.

In cameras of this kind, the focusing for keeping the formation of an image on a certain plane which corresponds to the distance of the object is done by displacing forward and backward the turret as a whole. However since the turret is in some cases provided with fairly heavy taking lenses, the displacement forward and backward of the whole turret requires a complicated mechanism. In view of its rigidity, the stroke also is limited to a range from 20 to 30 mm., namely the near distance of the focusing. Especially when a long focus lens is used, a close-up shot is impossible. Further owing to the heaviness of the taking lenses, the turret bends to forming an obstruction to smooth displacement forward and backward, eventually, even to movement. Moreover in said camera there are many other disadvantages such as light leakage or penetration of dirt through joint connections.

Figure 2:
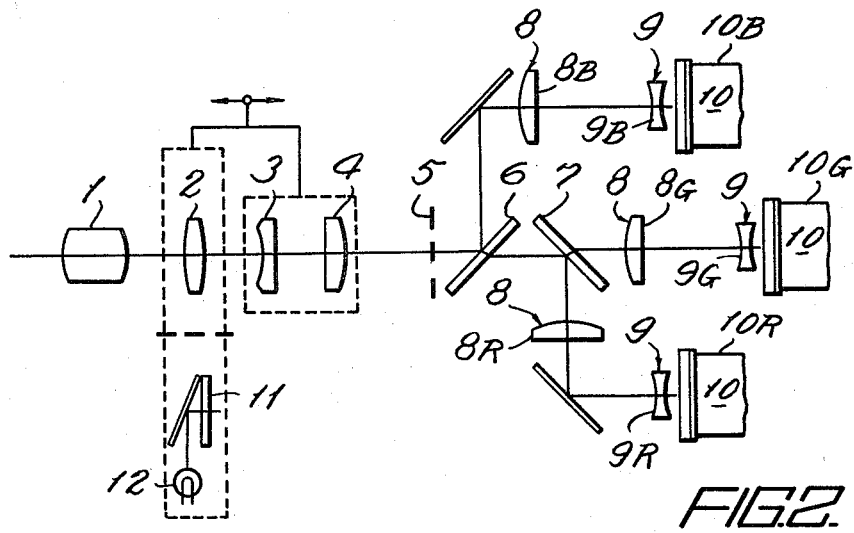
FIG. 2 shows the optical system of a color television camera with an internal focusing mechanism in accordance with the present invention.

With reference to FIG. 2, the explanation will be given hereinafter on the optical system of an internal focusing camera in accordance with the present invention. The image formed by the taking lens 1 on the first principal plane of the field lens 2 is relayed to image orthicon tube 10 by the relay lens system 3, 4, 8 and 9. Light flux thereof is resolved in three colors by dichroic mirrors 6 and 7 interposed between 4 and 8. The image of each color is formed on the respective orthicon tube. Field lens 2 is necessary for introducing the light flux passing through the lens 1 into the aperture of the relay lens system. Consequently the powers respectively corresponding to any focal length and composition of the taking lens are required. As many powers are provided as the number of taking lenses. It is arranged that when the taking lens is changed by the turret, field lens corresponding to said lens is changed integrally with the latter.

The second principal plane of field lens 2 is so disposed as to agree with the first focal plane of the front relay lens system 3 and 4 so that light flux directed by the field lens 2 in an appropriate direction, passing the front relay lens system 3 and 4, becomes a parallel light flux. Since dichroic mirrors 6 and 7 are interposed at the position where the light flux becomes parallel, the change of reflection characteristics, caused by the change of the incidence angle, astigmatism caused by the inclined disposition of a mirror, the change of the optical path length caused by the permissible error in thickness of a mirror and a ghost image caused by rear reflection etc. are all prevented.

To each light path of the three channels produced by dichroic mirrors are disposed a rear relay lens system 8R, 9R; 9G; 8B and 9B. On the face plates of the three image orthicon tubes 10R, 10G and 10B there are formed images of identical size in different colors. Since the front relay lens system 3 and 4 and the rear relay lens system 8 and 9 are equal in focal length, the magnification of formation of the image becomes 1X, and the images on the face plates of the three orthicon tubes are of identical form and size as those on the image face of the taking lens.

As above stated since field lens 2 is necessary, the aberration will be considered for the whole relay lens system including the field lens. The front relay lens system 2, 3 and 4, includes the field lens 2 of high power. The Petzval sum is markedly increased. It is difficult for the relay lens system 2, 3 and 4 itself to remove a field curvature and astigmatism. So in the present invention there is provided a negative lens 9 of high power, disposed near the focus face of the rear lens system, namely just in front of the face plate of the orthicon tube scarcely affects the focal length of the whole rear relay lens system and that the increase of the Petzval sum caused by field lens 2 is cancelled by a marked reduction by the negative lens 9. Thus for the relay lens system as a whole the Petzval sum becomes almost nothing, which results in the complete correction of field curvature and astigmatism. The distortion caused by the negative lens 9 is corrected by the structure of the front relay lens system which will be explained hereinafter.

In the camera in accordance with the present invention the turret rotates merely for switching the taking lens 1 and the field lens 2. Since it is fixed in front and back, its rigidity is sufficiently assured. The focusing is accomplished by displacing the forward and backward front relay lens system 3 and 4 integrally with the corresponding field lens 2 so as to make the image formed by the taking lens 1 always agree with the first principal plane of the field lens 2.

It apparently seems simple to do the focusing by the displacement forward and backward of the front relay lens and the field lens, because, in FIG. 1 for instance, if light flux is in parallel between the front relay lens 3 and rear relay lens 8, the focusing is accomplished by integral displacement of the front relay lens 3 and field lens 8. However viewed technically, there are problems. Namely when the front relay lens 3 is displaced in relation to the position of the fixed diaphragm 5, the position of the pupil is displaced with the change of aberration thereby caused, unfavorably for forming a good image in the whole area of focusing.

To explain the optical system in accordance with the present invention again with reference to FIG. 2, the front relay lens system is constructed by two independent groups: positive power parts 4 and negative parts 3. In focusing, the front relay lens system is displaced forward and backward together with field lens 2 so that the positions of the pupil of members 3 and 4 change in relation to diaphragm 5 of a fixed position, resulting in changing the respective aberrations. However, the front relay lens system 3 and 4 is schemed on the basis of the same conception as a zoom lens such that the compound aberration, obtained by assembling with aberrations of members 3 and 4 is always kept constant in the whole area of focusing. The relay lens system is schemed so that the aberration-residual of a certain amount and that of the rear relay lens system 8 and 9 cancel each other. It is needless to say that the distortion produced by the above negative lens 9 is cancelled altogether. Accordingly it comes to that for the relay lens as a whole, a good image is always formed on the face plate of orthicon tube 10 in the whole area of focusing.

As above stated the structure of the front relay lens system consists of two groups of positive power and negative power to form so-to-say a telephoto type, the full length of the lens system thereof being markedly reduced. This enables providing for a wide space between the rear end 4 of the front relay lens system and diaphragm 5. Accordingly the amount of displacement of 2, 3 and 4, namely the stroke of the focusing can be extended to more than twice that of the known turrets of forward and backward displacement type (60 mm. in example) and moreover with smooth displacement in no irrational construction. Since the lens groups move in an enclosure of the camera body, there is no fear of light leakage, penetration of dirt, etc. Besides in the optical system of the present invention, the use of a long stroke makes it possible for an ultra close-up shot with a specially long focus lens, which has never been conceived.

Figure 3:
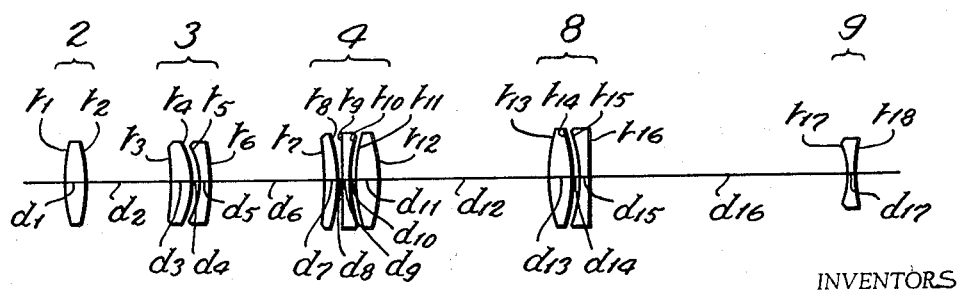
FIG. 3 shows an exemplified embodiment of the optical system in accordance with the present invention.

The embodiment of the optical system of a color television camera planned and designed for adjusting the abberation as above explained in concretely illustrated in the following table and FIG. 3.

TABLE

| | | | |
|---|---|---|---|
| $r_1 = 0.37$ | $d_1 = 0.053$ | $Nd = 1.5163$ | $v = 64.1$ |
| $r_2 = -0.37$ | $d_2 = 0.385$ to $0.685$ | | |
| $r_3 = -2.86$ | $d_3 = 0.063$ | $Nd = 1.6127$ | $v = 58.7$ |
| $r_4 = -0.43$ | $d_4 = 0.032$ | | |
| $r_5 = -0.18$ | $d_5 = 0.018$ | $Nd = 1.6127$ | $v = 58.7$ |
| $r_6 = -0.7$ | $d_6 = 0.237$ | | |
| $r_7 = -1.2$ | $d_7 = 0.041$ | $Nd = 1.6127$ | $v = 58.7$ |
| $r_8 = -0.53$ | $d_8 = 0.005$ | | |
| $r_9 = -1.5$ | $d_9 = 0.018$ | $Nd = 1.6730$ | $v = 32.1$ |
| $r_{10} = 0.6$ | $d_{10} = 0.009$ | | |
| $r_{11} = 0.69$ | $d_{11} = 0.081$ | $Nd = 1.6127$ | $v = 58.7$ |
| $r_{12} = -0.21$ | $d_{12} = 1.02$ to $0.72$ | | |
| $r_{13} = 0.49$ | $d_{13} = 0.068$ | $Nd = 1.6127$ | $v = 18.7$ |
| $r_{14} = -0.46$ | $d_{14} = 0.009$ | | |
| $r_{15} = -0.42$ | $d_{15} = 0.023$ | $Nd = 1.6476$ | $v = 33.8$ |
| $r_{16} = -61.7$ | $d_{16} = 0.76$ | | |
| $r_{17} = -0.19$ | $d_{17} = 0.013$ | $Nd = 1.5163$ | $v = 64.1$ |
| $r_{18} = 1.5$ | | | |

In the table, $r$ designates the radii of curvature of the refractive surfaces; $d$, the thicknesses of the lenses or air spaces; $Nd$, the retractive indices of lens materials in relation to $d$-ray; $v$, Abbe's numbers; $r_1$–$r_2$ designates the field lens; $r_3$–$r_{12}$, the front relay lens system; $r_{13}$–$r_{18}$, the rear relay lens system; and the focal length of the front and rear relay lens system is respectively designated with 1. Further the numerals of the lenses in FIG. 3 respectively correspond to those of FIG. 2.

Finally on assemblage of a registration chart, one of the characteristics of a color television camera in accordance with the present invention is explained as follows:

In a color television camera, the taking picture is preceded by an adjustment and an inspection of every part. The simplest way for it is to position a registration chart in front of a camera at an appropriate distance to cause said chart to form an image on the face plate of an orthicon tube and then to check the focusing and the coincidence of colors. However such a method of checking is rather troublesome in that the registration chart must be carried separately at the time of cranking regardless of indoor shooting or location. Although alternately a collimator is fitted in front of the taking lens, instead of positioning a registration chart in front of a camera, it is equally troublesome to carry the collimator separately.

Since the portion which requires adjustment with a registration chart for examining whether the image of the taking lens is exactly relayed to the orthicon tube and the three colors exactly coincide with each other is limited from the field lens 2 to orthicon tube 10, such an object can be achieved as well with the chart disposed directly on the image forming face of the taking lens, that is, the principal plane of the field lens. Originally the field lens 2 is required for converging the direction of advance of the luminous flux passing the taking lens, it not being necessary, in case the chart is disposed directly on the position of the field lens and illuminated in an appropriate way. Moreover the size of the chart is sufficed with the size of the field lens. So one method for the above adjustment used heretofore is, instead of carrying either the chart or collimator separately, to fit the registration chart to one of the mounts of the turret of the field lens such that the face of said registration chart coincides with the principal plane of the field lens. However when such a method is used, one of the mounts of the field lens is used for the chart so that the mount of the taking lens, opposite to that of the field lens naturally cannot be used, most disadvantageously for interchange of the taking lenses.

Now the present invention is featured by providing a mount exclusively for the registration chart to the field lens turret. As shown in FIG. 2, the field lens turret is provided with a mount exclusively for fitting registration chart 11, other than those of the field lens opposite the taking lens, and it is so devised that the mere rotation of the turret permits putting the chart 11 on a position corresponding to the image forming face of the taking lens. Due to the absence of a mount for the taking lens corresponding to that of chart 11, the illumination of the chart cannot resort to a beam coming from the outside, when the chart is positioned in an optical axis.

Accordingly chart 11 is attached with lamp 12 as a light source. In this way the above adjustment can be carried out only in the interior of the camera with no necessity of carrying either a chart or a collimator without resorting to a beam coming outside.

It will be understood that the optical system which has been illustrated is not limitative. Any modification thereof within the scope of the spirit of the claims will be considered to remain within the present invention.

What we claim is:

1. A color television camera comprising an object lens means, transducing means for translating visual images into electrical signals representative of the color characteristics of said images, a front and a rear relay lens means which are interposed between said object lens means and said transducing means for passing light rays parallelly from said front relay lens means to said rear relay lens means, said front relay lens means being mounted for movement relative to said object lens means along the path taken by said light rays, to enable said camera to be focused, the dichroic mirrors arranged between said front and rear relay lens means for resolving light from said front relay means into three primary colors, said front relay means being divided into two parts, of which the front part is the negative one and the rear part is the positive one so that any aberration may be effectively corrected in the old focusing range.

2. A color television camera in accordance with claim 1 wherein said rear relay lens means is divided into two parts of which the front part is the positive one and the rear part is the negative one, said rear part being disposed close to said transducing means so as to correct any aberration.

3. A color television camera in accordance with claim 1 wherein said rear relay lens means is divided into two parts, of which the front part is the positive and the rear part is the negative, said rear part being disposed close to said transducing means so as to correct any aberration, a field lens being disposed between the object lens means and the front relay lens means, and the field lens means and the front and rear relay lens means having the following specific values:

of said dichroic mirrors for relaying to said transducing means three light beams of the respective primary colors, said transducing means consisting of three image orthicon tubes rearwardly disposed of said three other relay means for receiving the respective light beams, the arrangement being such that the light rays are parallel to one another as they leave the first-mentioned relay lens means, said first-mentioned relay lens means including field lens means, and said three other relay lens means including respective negative lenses of high magnification disposed just in front of the photocathodes of said image orthicon tubes and serving to counteract field curvature causes by said field lens means.

5. A camera as claimed in claim 4 wherein said relay lens means comprises a telephoto lens means.

6. A camera as claimed in claim 4 wherein said field lens means comprises a plurality of field lenses mounted in a rotatable turret which is rearwardly and forwardly displaceable, said turret being provided with a mount which does not contain a field lens but contains a test chart and means for illuminating the rearward face of said chart, whereby said chart can be brought into said path.

| Lens or Lens Group | Radius of Curvature | Lens Thickness or Air Space Length | Index of Refraction | Abbe Number |
|---|---|---|---|---|
| Field lens | $r_1 = 0.37$ | $d_1 = 0.053$ | $Nd = 1.5163$ | $v = 64.1$ |
|  | $r_2 = -0.37$ | $d_2 = 0.385$ to $0.685$ |  |  |
| Front part of the front relay lens | $r_3 = -2.86$ | $d_3 = 0.063$ | $Nd = 1.6127$ | $v = 58.7$ |
|  | $r_4 = -0.43$ | $d_4 = 0.032$ |  |  |
|  | $r_5 = -0.18$ | $d_5 = 0.018$ | $Nd = 1.6127$ | $v = 58.7$ |
|  | $r_6 = -0.7$ | $d_6 = 0.237$ |  |  |
| Rear part of the front relay lens | $r_7 = -1.2$ | $d_7 = 0.041$ | $Nd = 1.6127$ | $v = 58.7$ |
|  | $r_8 = -0.53$ | $d_8 = 0.005$ |  |  |
|  | $r_9 = -1.5$ | $d_9 = 0.018$ | $Nd = 1.6730$ | $v = 32.1$ |
|  | $r_{10} = 0.6$ | $d_{10} = 0.009$ |  |  |
|  | $r_{11} = 0.69$ | $d_{11} = 0.081$ | $Nd = 1.6127$ | $v = 58.7$ |
|  | $r_{12} = -0.21$ | $d_{12} = 1.02$ or $0.72$ |  |  |
| Front part of the rear relay lens | $r_{13} = -0.49$ | $d_{13} = 0.068$ | $Nd = 1.6127$ | $v = 18.7$ |
|  | $r_{14} = -0.46$ | $d_{14} = 0.009$ |  |  |
|  | $r_{15} = -0.42$ | $d_{15} = 0.023$ | $Nd = 1.6476$ | $v = 33.8$ |
|  | $r_{16} = -61.7$ | $d_{16} = 0.76$ |  |  |
| Rear part of the rear relay lens | $r_{17} = -0.19$ | $d_{17} = 0.013$ | $Nd = 1.5163$ | $v = 64.1$ |
|  | $r_{18} = 1.5$ |  |  |  |

4. A color television camera comprising an object lens means, a transducing means for translating visual images into electrical signals representative of color characteristics of said images, a relay lens means disposed between said object lens means and said transducing means through which light rays pass from said object lens means to said transducing means, said relay lens means being mounted for movement relative to said object lens means, along the path taken by said light rays, to enable said camera to be focused, dichroic mirrors rearwardly mounted of said relay lens means for resolving light from said relay lens means into three primary colors, and three other relay lens means rearwardly disposed

References Cited by the Examiner

UNITED STATES PATENTS

| 2,578,420 | 12/1951 | Goodale et al. | 178—7.2 |
| 2,632,370 | 3/1953 | Shepard | 178—5.4 |
| 2,672,072 | 3/1954 | Sachtleben et al. | 178—5.4 |
| 2,808,456 | 10/1957 | Wittel | 178—5.4 |
| 2,909,097 | 10/1959 | Alden et al. | 88—1 |
| 3,126,446 | 3/1964 | Blancha | 178—5.4 |
| 3,207,841 | 10/1965 | Cook | 178—5.4 |

ROBERT L. GRIFFIN, *Acting Primary Examiner.*

JOHN W. CALDWELL, *Examiner.*

J. A. O'BRIEN, *Assistant Examiner.*